United States Patent [19]

Reynolds, Jr.

[11] 4,111,891
[45] Sep. 5, 1978

[54] FRICTION MATERIAL FOR RAILROAD DISC BRAKES

[75] Inventor: Harold John Reynolds, Jr., Littleton, Colo.

[73] Assignee: Johns-Manville Corporation, Denver, Colo.

[21] Appl. No.: 741,263

[22] Filed: Nov. 12, 1976

[51] Int. Cl.² .......................... C08K 3/04; C08K 3/34; C08K 7/12
[52] U.S. Cl. ....................................... 260/38; 106/36; 260/DIG. 39
[58] Field of Search ................. 106/36; 260/DIG. 39, 260/38

[56] References Cited

U.S. PATENT DOCUMENTS

| | | | |
|---|---|---|---|
| 2,201,191 | 5/1940 | Matthews | 260/DIG. 39 |
| 2,215,572 | 9/1940 | Wilson | 260/DIG. 39 |
| 3,673,276 | 6/1972 | Keller et al. | 260/DIG. 39 |
| 3,959,194 | 5/1976 | Adelmann | 260/DIG. 39 |
| 3,966,670 | 6/1976 | Grozen et al. | 260/DIG. 39 |

*Primary Examiner*—Sandra M. Person
*Attorney, Agent, or Firm*—Robert M. Krone; Joseph J. Kelly; James W. McClain

[57] ABSTRACT

A railroad disc brake shoe composition is disclosed comprising, in parts by weight:
  phenolic resin binder: 25–35 parts
  carbonaceous component: 2–12 parts
  asbestos fiber: 35–50 parts
  silicon carbide: 0.4–3 parts

16 Claims, No Drawings

FRICTION MATERIAL FOR RAILROAD DISC BRAKES

BACKGROUND OF THE INVENTION

The invention herein relates to a friction material. More particularly it relates to a friction material especially suitable as a brake shoe composition for railroad disc brakes.

In recent years an increasing number of railroad cars, especially passenger cars, have been equiped with disc brakes. In comparison to the older tread brakes, disc brakes are virtually free of any tendency of fade after prolonged application. In addition, since the rotor to which the brake is applied is mounted on the axle intermediate the wheels and does not come into contact with the track, the disc brake does not suffer deterioration by contact with the roughened surface of the wheel tread.

Certain previous disc brake shoe compositions, however, have suffered from excessive wear and have been unduly abrasive to the rotor. It would therefore be desirable to have a disc brake friction material for railroad disc brakes which would suffer less wear in service and be less abrasive to the disc brake rotor.

BRIEF SUMMARY OF THE INVENTION

The invention herein is a friction material useful as a brake shoe for railroad disc brakes which comprises, in parts by weight: phenolic resin binder, 25 to 35 parts: carbonaceous component, 2 to 12 parts; asbestos fiber, 35 to 50 parts; and silicon carbide, 0.4 to 3 parts. In further embodiments the friction material also comprises, in parts by weight: ground cashew particles, 2 to 10 parts; nitrile rubber, 0.5 to 12 parts; and/or inert filler, 1 to 25 parts.

DETAILED DESCRIPTION OF THE INVENTION

The basic component of the binder in this composition is phenolic resin. Such resins are the reaction products of phenols and formaldehyde. Such materials are quite well known and are widely described in the literature. A typical description will be found in the in the 1970–1971 *Modern Plastics Encyclopedia*, beginning on page 162. The phenolic resin will be present in the composition as from 25 to 35 parts by weight.

Another principal component of the invention is a "carbonaceous component." This material will be substantially pure carbon in granular or particular form, with particle sizes substantially (i.e., at least about 95%) less than about 74 microns (minus 200 mesh U.S. Seive Series). Larger particulate material within this range is often referred to as "carbon flour" while the finer particulate material is normally referred to as carbon black, lamp black or some similar term. The larger particles commonly have a graphitic structure while the fine particles such as carbon black tend to be more amorphous. The carbonaceous component will be present as from 2 to 12 parts by weight of the composition.

The third primary ingredient of the composition will be asbestos fiber, preferably chrysotile fiber. Such a fiber is normally graded by length. A standard grading system has been established by the Quebec Asbestos Mining Association using numbers, where the lower numbers represent the longer fibers and the higher numbers (grades 5–7) are the shorter fibers. Because of the molding requirements it is the shorter fibers which are useful in the present invention. In addition, the shorter fibers are considerably less expensive than the longer fiber grades. The asbestos fiber will be present in the composition as from 35 to 50 parts by weight.

The fourth principal ingredient of the present invention, and one which provides the unique friction properties of the present composition, is silicon carbide. The silicon carbide useful in the present invention will be of commercial purity. It will be in granular form, with particle sizes substantially all (i.e., at least about 95%) less than 44 microns (minus 325 mesh U.S. Seive Series). The silicon carbide will be present as from 0.4 to 3 parts by weight.

The preceding four materials are essential to the basic composition of this invention. However, if desired certain other materials may also be incorporated in the composition. A first choice for inclusion as a fifth component is cashew nut shell resin. This is a friction and wear modifier which has a tendency to moderate the more aggressive friction and wear properties of the other components, such as the silicon carbide. The cashew nut shell resin is a polymerized, partially or fully cured product made from cashew nut shell oil, which is largely a substituted phenol. The cured resin may be ground into particles which normally have a size range of from 20 to 100 mesh (Tyler Sieve Series). The cashew nut shell particles will be present as from 2 to 10 parts by weight of the composition. The cashew nut shell resin particles may be wholly or partially cured; experimental work suggests that the fully cured particles are preferable.

It has also been found advantageous to incorporate into the composition a nitrile rubber. This material combines with and is cured by the phenolic resin to form a mixed resin/rubber binder. The nitrile rubber will usually originally be in the form of particles and will be present in the composition as from 0.5 to 12 parts by weight.

Finally, the composition may also include one or more inert organic and/or inorganic fillers. Typical of the organic materials which may be present in ground tire peel. A typical inorganic filler is barytes (natural barium sulfate). There are, however, some limitations on the fillers which can be used. Because of the high temperatures which are generated in brake applications, the organic materials used as fillers should be stable at relatively high temperatures and should not have any significant volatile components. As to inorganic fillers, because lead is known to be detrimental in brake shoe compositions (see U.S. Pat. No. 3,959,194), it is preferred that the compositions of this invention contain no lead, litharge, or other lead containing components. Within these limitations, those skilled in the art will be readily able to select satisfactory fillers for use in the composition. In this composition the total filler content will be from 1 to 25 parts by weight, with the organic component 0.5 to 10 parts by weight and the inorganic component 0.5 to 15 parts by weight.

The materials may be molded into friction materials such as brake shoes for disc brakes in a conventional manner. This normally constitutes pre-mixing of the dry granulated ingredients, insertion of the mixture into a mold, and then molding at elevated temperature to cause the binder to form a solid matrix incorporating the other components.

A typical composition of this invention is illustrated in the example below. Also illustrated are comparative data showing the superiority of a brake shoe made with the present composition over a prior art brake shoe which contains no silicon carbide. In Table I all components are given in percent by weight (rounded off to the nearest whole percentage).

TABLE I

| Component | Prior Art Composition | Present Composition |
|---|---|---|
| Principal Components: | | |
| Phenolic Resin (a) | 25% | 29% |
| Carbon Flour | 5% | 6% |
| Asbestos Fiber (b) | 35% | 41% |
| Silicon Carbide | — | 1% |
| Zircon | 15% | — |
| Auxiliary Components: | | |
| Cashew Nut Shell Resin Particles | 5% | 6% |
| Nitrile Rubber (c) | 5% | 6% |
| Ground Tire Peel | 5% | 6% |
| Barytes | 5% | 6% |
| | 100% | 100% |

Notes
(a) "Durez" (trademark) resin no. 24867
(b) QAMA grade 7D chrysotile fiber
(c) "Hycar" (trademark) grade 1411 rubber Table II below illustrates test data from a Bendix (trademark) brake testing unit. In such tests friction materials were tested by applying a sample brake shoe of the test material to a rotor which rotates at a designated speed. At each designated rotor speed the test shoe was applied 30 times. Each application lasted 15 seconds and then there was a 45 second interval before the next application. In the examples shown below the bearing area of each test sample was approximately 4.2 square inches and each sample was applied with a loading force of 100 psi. Application tests were made at rotor speeds of 1500, 3000 and 4500 and 6000 feet per minute (fpm). Data on each of these tests as well as average data for the above-described composition of the present invention and prior art composition are presented below.

TABLE II

| Rotor Speed, fpm | Physical Property | Prior Art Composition Shoe | Present Composition Shoe |
|---|---|---|---|
| 1500 | Max. Temp., °F | 365 | 430 |
| | Wear, in | 0.004 | 0.010 |
| | Coef. of Friction | 0.54 | 0.59 |
| | Horsepower-hours | 1.26 | 1.38 |
| | Wear Rate, in$^3$/HP-hr | 0.003 | 0.007 |
| 3000 | Max. Temp., °F | 455 | 545 |
| | Wear, in$^3$ | 0.016 | 0.020 |
| | Coef. of Friction | 0.39 | 0.48 |
| | Horsepower-hours | 1.85 | 2.26 |
| | Wear Rate, in$^3$/HP-hr | 0.009 | 0.009 |
| 4500 | Max. Temp., °F | 570 | 605 |
| | Wear, in$^3$ | 0.063 | 0.037 |
| | Coef. of Friction | 0.41 | 0.39 |
| | Horsepower-hours | 2.87 | 2.71 |
| | Wear Rate, in$^3$/HP-hr | 0.022 | 0.014 |
| 6000 | Max. Temp., °F | 600 | 610 |
| | Wear in$^3$ | 0.065 | 0.060 |
| | Coef. of Friction | 0.32 | 0.33 |
| | Horsepower-hours | 2.95 | 3.12 |
| | Wear Rate, in$^3$/HP-hr | 0.022 | 0.018 |
| (Average) | Wear, in$^3$ | 0.037 | 0.032 |
| | Coef. of Friction | 0.42 | 0.45 |
| | Horsepower-hours | 2.23 | 2.37 |
| | Wear Rate, in$^3$/HP-hr | 0.017 | 0.014 |

It will be immediately apparent from Table II that while the properties of the prior art material are slightly better under the mild conditions imposed by the 1500 fpm test, the properties of the material of this invention, particularly wear rate and temperature stability, are significantly better under the more severe conditions of the higher speed tests for the composition of the present invention. Also the overall average properties of the composition of this invention are significantly better than those of the prior art material.

I claim:

1. A friction material useful as a brake shoe for railroad disc brakes which comprises, in parts by weight:
    phenolic resin binder: 25–35 parts
    carbonaceous component: 2–12 parts
    asbestos fiber: 35–50 parts
    silicon carbide: 0.4–3 parts 2. A friction material as in claim 1 further comprising, in parts by weight:
    ground cashew nut shell resin particles: 2–10 parts 3. A friction material as in claim 2 further comprising, in parts by weight:
    nitrile rubber: 0.5–12 parts 4. A friction material as in claim 3 further comprising, in parts by weight:
    inert filler: 1–25 parts 5. A friction material as in claim 4 wherein said filler comprises a mixture of organic and inorganic components.

6. A friction material as in claim 5 wherein said filler comprises a mixture of 0.5–10 parts by weight of ground tire peel and 0.5–15 parts by weight of barytes.

7. A friction material as in claim 1 wherein said carbonaceous component comprises a graphitic carbon.

8. A friction material as in claim 1 wherein said carbonaceous component comprises carbon black.

9. A friction material as in claim 2 wherein said ground cashew nut shell resin particles are fully cured.

10. A friction material as in claim 1 wherein said carbonaeous component is present as 4–8 parts by weight.

11. A friction material useful as a brake shoe for railroad disc brakes comprising, in approximate parts by weight:
    phenolic resin binder: 29 parts
    silicon carbide: 0.6 parts
    asbestos fiber: 41 parts
    graphitic carbon: 6 parts 12. A friction material as in claim 11 further comprising, in approximate parts by weight:
    fully cured ground cashew nut shell resin particles: 6 parts 13. A friction material as in claim 12 further comprising, in approximate parts by weight:
    nitrile rubber: 6 parts 14. A friction material as in claim 13 further comprising, in approximate parts by weight:
    ground tire peel: 6 parts
    barytes: 6 parts 15. A railroad disc brake shoe composed of the friction material of claim 1.

16. A railroad disc brake shoe composed of the friction material of claim 11.

* * * * *

UNITED STATES PATENT AND TRADEMARK OFFICE
CERTIFICATE OF CORRECTION

PATENT NO. : 4,111,891
DATED : September 5, 1978
INVENTOR(S) : Harold John Reynolds, Jr.

It is certified that error appears in the above-identified patent and that said Letters Patent are hereby corrected as shown below:

Column 1, line 13, "of" (2nd occurrence) should read --to--.

Column 3, line 41, <u>TABLE II</u>, "Wear,in" should read --Wear, $in^3$--.

Signed and Sealed this

Third Day of April 1979

[SEAL]

Attest:

RUTH C. MASON
Attesting Officer

DONALD W. BANNER
Commissioner of Patents and Trademarks